FLAW DETECTOR FOR DISCONTINUOUS SHEET LENGTHS

Filed March 22, 1968 2 Sheets-Sheet 1

INVENTOR.
MELVIN J. BINKS
BY
Davis, Lucas, Brewer & Brugman
ATTORNEYS

Sept. 8, 1970 M. J. BINKS 3,528,094

FLAW DETECTOR FOR DISCONTINUOUS SHEET LENGTHS

Filed March 22, 1968 2 Sheets-Sheet 2

INVENTOR.
MELVIN J. BINKS

BY
Davis, Lucas, Brewer & Brugman

ATTORNEYS

United States Patent Office 3,528,094

Patented Sept. 8, 1970

3,528,094

FLAW DETECTOR FOR DISCONTINUOUS SHEET LENGTHS

Melvin J. Binks, Barrington, Ill. (% Binks Industries Inc., 391 E. Potter Ave., Wood Dale, Ill. 60191)

Filed Mar. 22, 1968, Ser. No. 715,400
Int. Cl. G01n *21/32*
U.S. Cl. 250—219 18 Claims

ABSTRACT OF THE DISCLOSURE

A flaw detector for discontinuous sheet lengths traveling across an opaque surface with a narrow, elongated detection slot for passage of a planar light beam to a photo tube sensing flaws thereby. Rows of magnets in the surface proximate the slot, on either side, hold down the leading and trailing ends of passing sheets. The surface descends in steps across the slot, which is filled with transparent material. Photo transistors in the surface, proximate both sides of the slot, have separate restricted light beams directed thereon for detection of sheet absence to signal a control means for suppression of light exposure to and signal transmission from the photo tube. In one embodiment an ultra-fast reed relay, triggered by the photo transistors upon sheet absence, disconnects the photo tube dynode voltage supply. Simultaneously, a Schmitt trigger at the photo tube output is grounded by the photo transistors to suppress signal transmission during sheet absence.

BACKGROUND OF THE INVENTION

This invention relates generally to pin hole detectors and more particularly, to a flaw detector for discontinuous lengths of sheet material.

Detection of pin holes and other flaws in sheet materials, such as electrolytically tinned tin plate, is commonly accomplished by passing a continuous strip of sheet between light source and light sensor. For example, see U.S. Pat. No. 3,341,709 issued Sept. 12, 1967 to Melvin J. Binks. Manufacturing speeds, often as high as 5,000 or more feet per minute, and detection requirements of holes of one mil or less, necessitate pin hole detectors of precision and utmost sensitivity.

Heretofore, such flaw detectors have been utilized only for continuous strips of the sheet material in various phases of the processing of the tin plate. However, in detecting flaws in discontinuous sheet lengths, as opposed to a continuous strip, there is necessarily a gap between the sheets, that is, a sheet absence between the leading and trailing ends of adjacent sheets. The problem is to protect the sensitive photo tube from excessive light and to suppress the false signal during sheet absence. Further, it is desirable to provide a capability of detecting flaws on the order of one mil (.001" deep) and to do so as close as possible to the sheet ends.

Therefore, in addition to the usual problem of eliminating extraneous light leakage around the side edges of a continuous strip of sheet material, separate sheet lengths have posed other problems. That is, elimination of extraneous light leakage at the leading and trailing sheet ends, and protection of the sensitive photo tube during absence of a sheet between it and the light source, as well as a simultaneous suppression of a false flaw indication therefrom. The requirements of high speed extreme sensitivity, and detection close to sheet ends have, in the past, made these extremely complex problems insurmountable. The advent of modern electronic and optical components, such as, photo transistors and ultra-high speed reed relays, have made a solution feasible, and such are embodied in the present invention.

SUMMARY OF THE INVENTION

Therefore, to overcome the foregoing and other difficulties of the prior art, it is the general object of this invention to provide new and improved machinery capable of high speed flaw detection in discontinuous sheet lengths. To this end, the present invention teaches modification of existing pin hole detectors for continuous strips of sheet material, making possible similar detection for discontinuous sheet lengths.

Leakage of extraneous light at the leading and trailing ends of the sheets is diminished by a hold-down means, which in the preferred embodiment, is provided by rows of magnets in the surface of wear strips defining the opposite longitudinal edges of a detection slot. The sheet ends are kept from catching in the slot by guide means; for example, by filling the slot with a transparent material. Moreover, the wear strip surfaces and transparent material are arranged in descending steps across the detection slot. As a further aid in eliminating light leakage at sheet ends, a narrow and elongated aperture restricts the light source to a planar beam trained on the detection slot for admission to the sensitive light sensor therebelow.

Individual photo transistors in the wear strip surface proximate the detection slot on either side thereof, have individual restricted light beams trained thereon to detect the absence of a sheet over the detection slot. Suitable amplification of the photo transistor impulses therefrom is utilized. Protection for the sensitive light sensor is afforded by an ultrafast reed relay, triggered by the photo transistors to disconnect the light sensor energizing supply. Simultaneously, a false defect indication is suppressed by amplified impulse grounding a Schmitt trigger controlling the light sensor output.

Thus, one of the objects of this invention is accurate, high speed flaw detection for discontinuous sheet lengths.

It is an object of this invention to eliminate extraneous light leakage at the leading and trailing ends of discontinuous sheet lengths in a flaw detector.

Another object of this invention is to provide protection of a sensitive photo tube from excess light exposure during absence of a sheet over the detection slot in a flaw detector.

It is still another object to eliminate false defect indications by suppressing the signal during absence of a sheet.

Yet another object is to provide a dependable high speed flaw detector for discontinuous sheet lengths.

Further and other objects, and a more complete understanding of the invention may be had by referring to the following description and claims, taken in conjunction with the accompanying drawings.

DESCRIPTION OF THE DRAWINGS

For the purpose of illustrating the invention, there is shown in the drawings a form which is presently preferred, it being understood, however, that this invention is not necessarily limited to the precise arrangements and instrumentalities there shown.

DESCRIPTION OF THE PREFERRED EMBODIMENT

Figure 1:
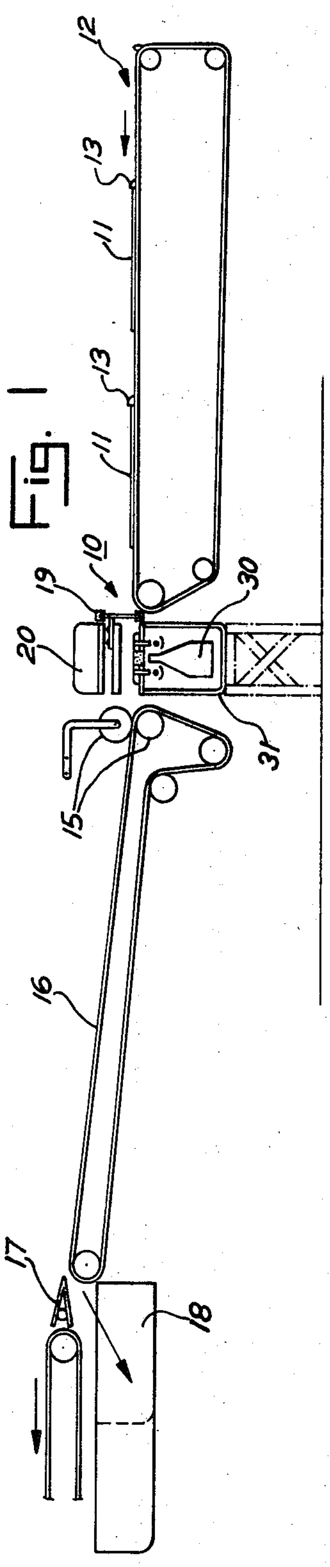
FIG. 1 is a diagrammatic view of the invention.

Referring now to the drawings in detail, wherein like numerals indicate like elements, there is shown in FIG. 1 an illustration of the present invention designated generally at 10. Individual cut sheets 11 are fed on a conveyor 12 spaced at intervals by the studs 13. The sheets 11 are fed in the direction of the arrow for flaw detection in detector 10. Pick-up and removal of sheets 11 from the detector 10 are provided by pinch rollers 15 and conveyor 16. A pivotable tongue 17 responds to defect indications from detector 10, by dumping rejected sheets into bin 18. Though not shown, it is understood that a flaw indication signal operates a typical memory device, timed to conveyor 16, so that the tongue 17 may be raised for a time period sufficient for a defective sheet to clear. The tongue 17 is operable, then, by conventional electronic, mechanical, or hydraulic machinery activated by the memory device. Furthermore, it is understood that side edge shields 19 are provided for the same purpose as in the continuous strip pin hole detectors, for example, those disclosed in the aforementioned U.S. Pat. No. 3,341,709.

Figures 2, 3:
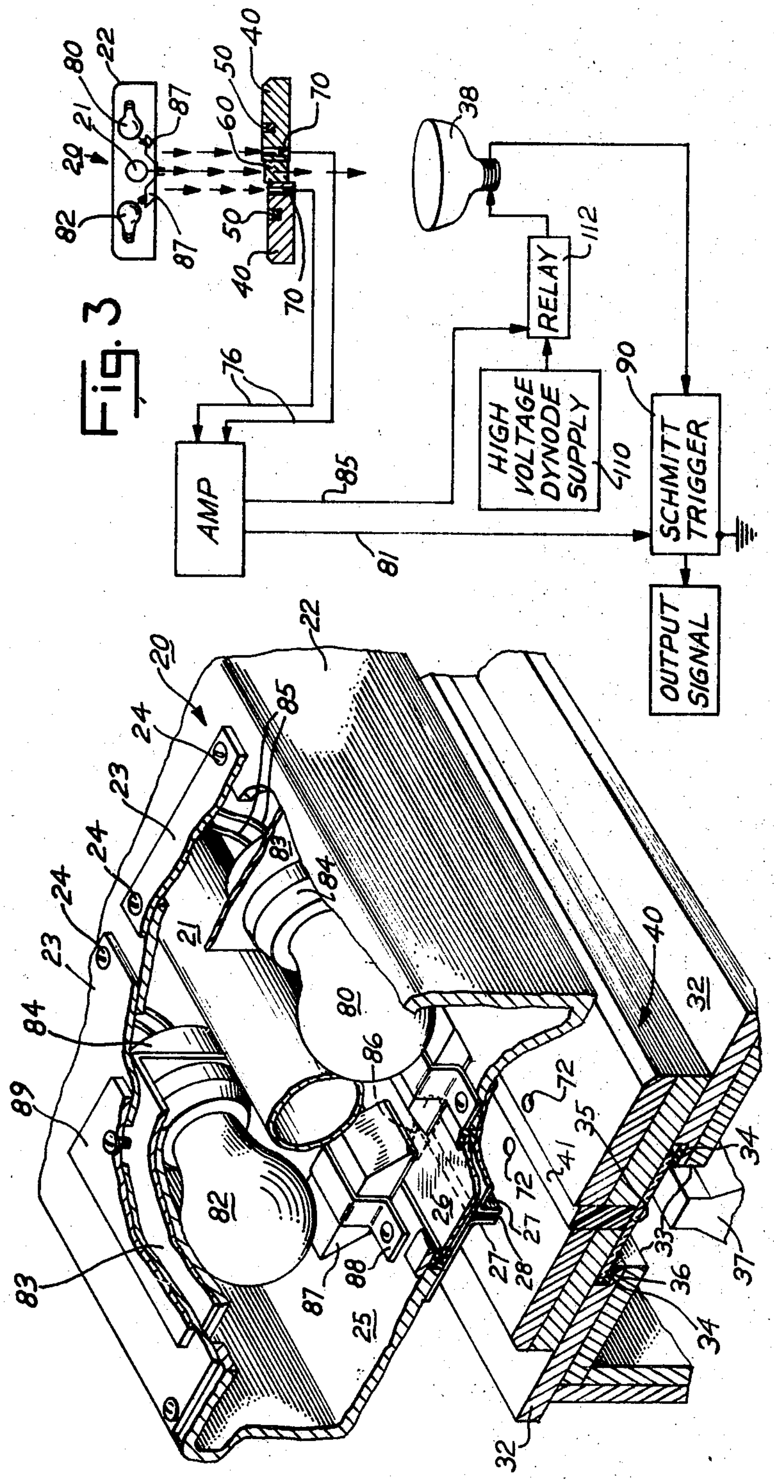
FIG. 2 is a perspective, partially in section, illustrating the detail of the light source and the wear strip surface defining the detection slot of the present invention.
FIG. 3 is a schematic diagram illustrating the system components of an embodiment of the invention.

A detector light source is indicated generally at 20 in the drawings, with reference being made to FIG. 2 for detail. As is the practice in the art, an elongated fluorescent tube 21 enclosed within the opaque casing 22 and connected to an electrical power source is utilized as a light source. Access openings at the top casing 22 are enclosed by plates 23 secured at each corner by a machine screw 24, as shown. The casing bottom wall 25 has an elongated opening 26 directly below tube 21. A transparent material, such as glass of desired optical property may be provided to enclose opening 26. As shown, lengths of angle section 27 enclose the opening 26 to frame a narrow, elongated aperture 28 directly beneath the tube 21. In this manner, the light from source 20 is restricted to project a narrow planar beam downward.

Figure 4:
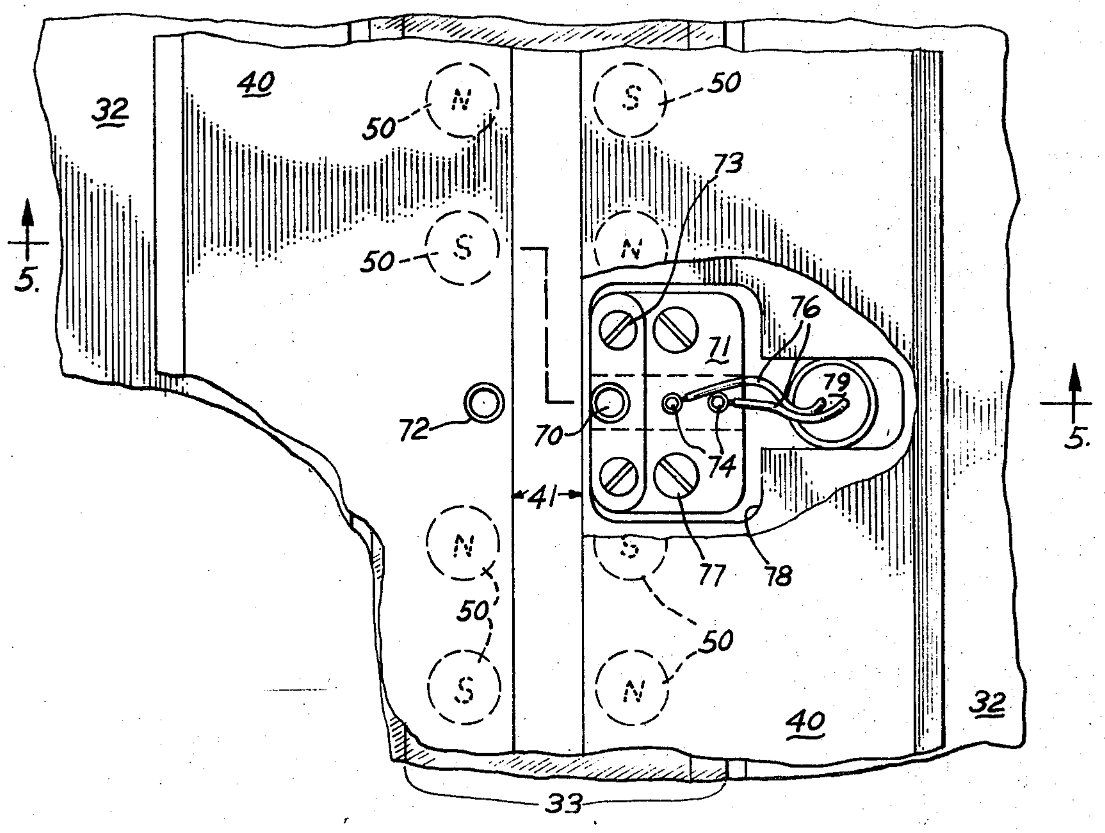
FIG. 4 is a plan view of the opaque wear strip surface showing the details of magnet and photo transistor placement.
Figure 5:
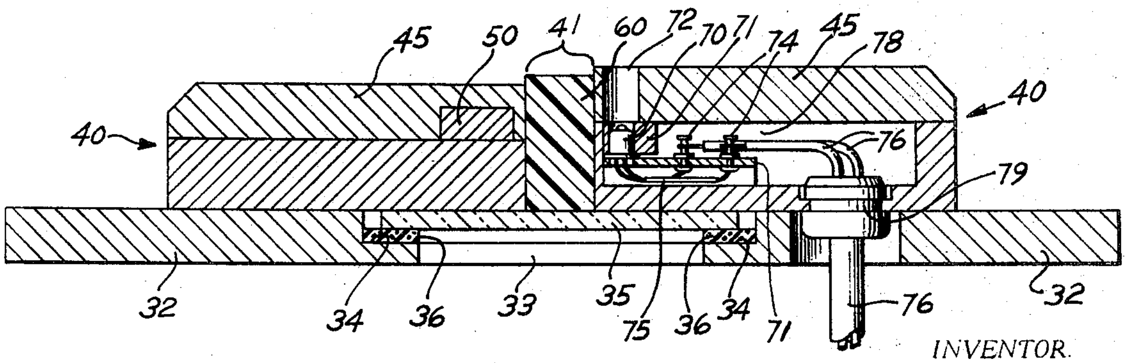
FIG. 5 is a cross section taken along lines 5—5 of FIG. 4.

The light sensor is designated generally in FIG. 1 by the numeral 30 within a light-tight housing 31. The uppermost wall 32 of housing 31 provides a flat, horizontal support surface and an opaque barrier between the light source 20 and light sensor 30. As may be visualized best with reference to FIGS. 2, 4 and 5, upper wall 32 has an elongated central opening 33 therethrough directly beneath the light source 20 and above light sensor 30. Notice that uppermost wall 32 is recessed along the edges of opening 33 to provide a shelf 34 on both sides thereof. As shown, the opening 33 may be enclosed by a transparent material, such as glass 35, having desired optical qualities, which rests on resilient gaskets 36 seated on the shelves 34, as illustrated at FIGS. 2 and 5. If desired, the light sensor 30 may employ the optical system which is the subject of Pat. No. 3,188,478 issued June 8, 1965, to Melvin J. Binks. That is, aligned glass fiber bundles 37, partially shown in FIG. 2, directing the light for even distribution upon a photo-sensitive element, such as the photo tube 38 (schematically shown in FIG 3), of a well-known type commonly used in present-day pin hole detection.

It is understood, of course, that other photo-sensitive elements, other than photo tubes, such as photo cells, light sensitive transistors, etc., may also be satisfactory.

Sheets 11 ride over the housing 31 upon wear strips 40 which are seated on uppermost wall 32 and define the edges of an elongated detection slot 41 through which the planar light beam passes from source 20 to sensor 30.

Hold-down means to keep the ends of passing sheets 11 flat against the upper surfaces of wear strips 40 are provided by small magnets 50 mounted as close to the detection slot 41 as possible. The magnets 50 may be either of the permanent or electro types. Notice that magnets 50 are evenly spaced and adjacent ones are of opposite pole. As may be visualized best by reference to FIG. 5, the uppermost portion 45 of the wear strips 40 are of a non-magnetic material, such as Formica, and the magnets 50 are located just below the surface thereof. Other hold-down means, not illustrated, such as vacuum or rollers, are also understood to be available to hold the sheet ends down flat against the wear strips 40 at the edges of detection slot 41 to attenuate extraneous light leakage.

As illustrated best with reference to FIG. 5, the detection slot 41 is filled with a transparent material, such as an optical plastic light pipe 60, to provide a guide means across the detection slot 41 which prevents the ends of the passing sheets 11 from catching therein. The light pipe 60 also acts as a light conductor directing light downward onto photo tube 38. It is understood, of course, that other guide means are available, for example, spaced lengths of spring steel or honeycomb material mounted edgewise. Additionally, it is noted that the wear strips and transparent light pipe 60 present upper surfaces that descend in steps from upstream to downstreatm with respect to passing sheets. It is to be noted that the steps should be small (FIG. 5 is illustrative and not to scale), preferably on the order of one-thirty second of an inch increments.

First and second detection means, for indications of presence or absence of a sheet 11, are provided by photo transistors 70 located beneath the surface of wear strips 40 and as close to the detection slot 41 as practicable. As indicated by the cross-section of FIG. 5, each photo transistor 70 is directly beneath a pupil 72, provided by an aperture through the nonmagnetic portion 45 of the wear strips 40. Pupil 72 may be filled with a transparent material, such as an optical plastic. The photo transistors, which may be of the NPN planar silicon type, are secured in a mount 71 by machine screws 73 (shown in FIG. 4). Terminals 74 are provided on the mount 71 for connection of photo transistor leads 75 to external conduits 76. Mount 71 is secured by machine screws 77 within a hollow chamber 78 in the wear strips 40, as shown. The external conduits 76 are secured in an opening at the bottom of the chamber 78 by an anchor grommet 79. An opening, shown in FIG. 5, in upper wall 32, is provided for passage of the conduits 76 into the interior of the light tight housing 31. As indicated in FIG. 4, a photo transistor 70 is provided on each side of the detection slot 41. Furthermore, it is understood that several of such light sensor means may be provided on each side of the detection slot 41, if desired. Although the embodiment shown utilizes light on a photo transistor, a variety of detection means are available. For example, an ultrasonic or compressed air beam trained on a pressure-sensitive element, such as a piezo crystal. Also, for specific application, laser beams, light emitting diodes, proximity pick-ups, etc., may be utilized.

It is further understood that the detection means may be entirely on the same side of the sheet length by utilizing reflective instead of interceptive principles. That is, the light source can be beamed to the sensitive elements, both on the same side of the sheet lengths.

Separate light sources are provided for each of the photo transistors 70, respectively, because they do not respond satisfactorily to a fluorescent tube 21. That is, as best seen with reference to FIGS. 2 and 3, the separate incandescent light bulbs 80, 82. Brackets 83 support the bulb sockets 84, as shown, within the casing 31. Conduits 85 provide electric power thereto. Each source provides a small, restricted light beam which impinges on each of the photo transistors 70. For this reason, a notch 86 is cut in the lengths of angle section 27 at each side of the elongated opening 28, as shown. Prisms 87, held in place by the brackets 88, direct the light from the bulbs 80, 82 inward and downward through the notches 86. In this manner a narrow restricted light beam is projected to impinge upon the respective photo transistors 70. Access plates 89, held in place by machine screws, may be provided, as shown.

Reference is made to FIG. 3, which shows the electronic components of the invention in simplified block diagram form. It is understood, of course, that any number of conventional electronic circuits are available for the components represented in the blocks.

It is further understood that an output signal from photo tube 38 activates conventional equipment to mark and/or reject defective sheets, as in the example shown, to operate the pivotable tongue 17. Sophisticated electronic equipment, such as memory devices and timers, though not shown, are also available for operation in response to the output signal. It is noted that a simple memory device may be utilized to register only one defect, in the event of multiple defects in a sheet.

The conduit 76 connects the photo transistors 70 to an amplifier shown schematically at FIG. 3. In this manner, the signals from photo transistors 70 are sufficiently strengthened to activate components of the invention.

FIG. 3 shows control means to govern light exposure to and signal transmission from the photo tube 38.

Output control for photo tube 38 is provided by a Schmitt trigger 90. As shown, an output 81 of the amplifier is fed to ground an element of the Schmitt trigger 90 which thereby prevents signal transmission from the photo tube 38. The Schmitt trigger is preferred because it can discriminate from normal circuit noise below a pre-set limit.

Input control is also provided for controlling the energizing supply to the photo tube 38, that is, the high voltage dynode supply 110. A relay 112, operated in response to signals from output 85 of the amplifier, is connected to open the high voltage dynode supply circuit, when activated thereby de-energizing photo tube 38.

Relay 112 must, of course, have an operational and release time of extremely short duration, that is, on the order of one to two milliseconds. Ultra-fast reed relays, such as those manufactured by the Magnecraft Electric Company, Chicago, Ill., are suitable. A transistor circuit may be used in place of relay 112, if desired. It is understood that if slower operational speeds are desired, or if the detection requirements be at a farther distance from the sheet ends, that more conventional types of relays could be utilized.

Operation of the invented pin hole detector for separate sheet lengths will be described by reference to the schematic drawings of FIGS. 1, 3. Separate sheets 11 are fed on the conveyor 12 to the flaw detector 10. The edge shields 19, visible in FIG. 1, may be manually adjusted to the width of the sheets 11. On the other hand, an automatic hydraulic operation of the edge shields 19, now commonly in use for continuous sheets, may also be utilized; however, an override (not shown) must be provided during sheet absence. Light from the fluorescent tube 21 and the separate light bulbs 80, 82 is completely blocked, except for defects, during sheet presence over detection slot 41. The leading sheet ends will be held down flat against the upper surface of wear strips 40 by the magnets 50. The sheet ends will follow along the steps provided across the wear strips 40 and optical light pipe 60. The planar beam of tube 21 and narrow restricted beams of bulbs 80, 82 are, in this manner, completely blocked and the likelihood of ambient light leakage is minimized.

As a sheet trailing end passes by, a detector pupil 72 is uncovered. This exposes a photo transistor 70 to an impinging restricted beam. A responsive signal is generated by the photo transistor and strengthened by the amplifier to activate the control means. At FIG. 3, the amplified signal, at amplifier output 81, grounds the Schmitt trigger 90 to suppress all output signals from sensor 38. Simultaneously, reed relay 112 is activated by a signal from amplifier output 85 to cut off the high voltage dynode supply 110. Thus, photo tube 38 is completely protected. Furthermore, false defect indications, during absence of sheet, are also eliminated.

The present invention may be embodied in other specific forms without departing from the spirit of potential attributes thereof and, accordingly, reference should be made to the appended claims, rather than to the foregoing specification, as indicating the scope of the invention.

I claim:

1. In a machine for inspecting opaque sheets for pin hole openings by moving a succession of such sheets in tandem spaced relation through a scanning zone between a light source and light responsive sensor means operable, when energized, to generate output signals indicative of defective sheets; the combination comprising: means for detecting the spacing between adjacent ends of successive sheets prior to the entry of the trailing end of the leading sheet into said scanning zone, and control means periodically actuated by said detecting means comprising first means operable to render said sensor means non-responsive to light and additional means operable to render transmission of output signals from said sensor means ineffective.

2. The combination of claim 1, wherein said detection means operatively responds to the upstream and downstream limits of said spacing and comprises at least two detecting devices positioned one adjacent the upstream and one adjacent the downstream margin of said zone.

3. The combination of claim 1, wherein said detecting means actuates said control means until both said adjacent ends have cleared said zone.

4. The combination of claim 1, wherein said first means operates to effectively de-energize said sensor means.

5. The combination of claim 1, wherein said additional means operates to terminate transmission of signals from said sensor means.

6. A machine in accordance with claim 1, wherein said additional means is a Schmitt trigger having an element inhibited by actuation of said control means and wherein said first means is an ultra-fast type reed relay.

7. A machine in accordance with claim 6, wherein said detection means include photo-sensitive elements and an amplifier therefor.

8. A machine for detecting flaws in successive sheet lengths traveling at spaced intervals therethrough comprising in combination: a light source; sensor means to transmit signals in response to light; supporting means providing a surface defining a travel path for said sheet lengths between said source and sensor means, said surface having a narrow elongated slot for passage therethrough of light from said source to said sensor means; control means to govern energization of said sensor means and signal transmission therefrom; and detection means proximate said slot and activated throughout the passage of the spacing between adjacent ends of successive sheet lengths over said slot to actuate said control means for de-energizing said sensor means and preventing signal transmission therefrom.

9. A machine in accordance with claim 8, including an opaque casing enclosing said source, said casing having a narrow elongated aperture aligned with said slot for light projection in a planar beam therethrough.

10. A machine in accordance with claim 8, wherein said surface includes hold-down means to hold said ends of said sheet lengths thereagainst for attenuation of light leakage thereabouts.

11. A machine in accordance with claim 10, wherein said hold-down means are magnets in said surface and proximate said slot.

12. A machine in accordance with claim 11, wherein adjacent of said magnets have opposite poles respectively.

13. A machine in accordance with claim 10, wherein said slot includes guide means thereacross to prevent said ends of said sheet lengths from catching in said slot.

14. A machine in accordance with claim 13, wherein said guide means are provided by an optically transparent material filling said slot.

15. A machine in accordance with claim 14, wherein said guide means are provided by arranging said surface and transparent material in descending steps, from upstream to downstream sides of said path.

16. The combination of claim 8, wherein said detection means comprise plural light sensitive elements located beneath said surface and adjacent opposite sides of said slot, said elements operating at the limits of the spacing between adjacent ends of said successive sheet lengths to actuate said control means.

17. A machine in accordance with claim 16, including an opaque casing enclosing said source, said casing having a narrow elongated aperture and restricted apertures aligned with said slot and elements, respectively, to project a planar beam to said slot and restricted narrow beams to said elements, respectively.

18. A machine in accordance with claim 16, wherein said elements are phototransistors operatively associated with separate light sources having spectral frequency for actuating the same.

References Cited

UNITED STATES PATENTS

| | | | |
|---|---|---|---|
| 1,894,636 | 1/1933 | Scheibell | 250—225 X |
| 2,976,758 | 3/1961 | Parker | 250—203 X |
| 3,155,831 | 11/1964 | Goodwin et al. | 250—219 X |
| 3,188,478 | 6/1965 | Binks | 250—219 |
| 3,393,322 | 7/1968 | Linderman et al. | 250—219 |

WALTER STOLWEIN, Primary Examiner

U.S. Cl. X.R.

250—223; 356—237